United States Patent [19]
Abe

[11] Patent Number: 5,353,271
[45] Date of Patent: Oct. 4, 1994

[54] METHOD AND APPARATUS FOR RECORDING OR REPRODUCING INFORMATION ON OR FROM RECORDING MEDIUM

[75] Inventor: Michiharu Abe, Yokohama, Japan

[73] Assignee: Ricoh Company, Ltd., Tokyo, Japan

[21] Appl. No.: 930,778

[22] Filed: Aug. 17, 1992

[30] Foreign Application Priority Data

Aug. 29, 1991 [JP] Japan .................................. 3-218560

[51] Int. Cl.⁵ .............................................. G11B 7/007
[52] U.S. Cl. ........................................ 369/59; 369/48; 369/54; 369/124
[58] Field of Search ...................... 369/59, 54, 47, 48, 369/49, 124, 116, 121; 360/39, 45; 346/76 L, 1.1

[56] References Cited

U.S. PATENT DOCUMENTS

| | | | |
|---|---|---|---|
| 4,646,103 | 2/1987 | Sugiyama et al. | 369/54 |
| 4,835,759 | 5/1989 | Saito et al. | 369/59 |
| 4,866,692 | 9/1989 | Saito et al. | 369/51 |

*Primary Examiner*—W. R. Young
*Assistant Examiner*—Thang V. Tran
*Attorney, Agent, or Firm*—Cooper & Dunham

[57] ABSTRACT

A method for recording or reproducing information on or from a recording medium, the method capable of reproducing serial data on the basis of signals derived on each of front edges or each of rear edges of a plurality of pieces of recorded information on the recording medium, includes the steps of reproducing bit-synchronization signals corresponding to each ones of the front and rear edges from signals derived on the front and rear edges alternately provided in the recorded information, the bit-synchronization signals having individual phases but the same frequency as each other, switching the bit-synchronization signal for each of the front edges into the other bit-synchronization signal for each of the rear edges or vice versa after a predetermined time each time the bit-synchronization signal is detected, synthesizing the bit-synchronization signals so that a phase of the synthesized bit-synchronization signal constantly matches to phases of the front and rear edges to be detected, and sequentially reproducing the serial data from signals derived on a lot of the front and rear edges by using the synthesized bit-synchronization signal.

3 Claims, 4 Drawing Sheets

METHOD AND APPARATUS FOR RECORDING OR REPRODUCING INFORMATION ON OR FROM RECORDING MEDIUM

BACKGROUND OF THE INVENTION

1. Field of the Invention

The present invention relates to a method and an apparatus for recording or reproducing information on or from a recording medium, and more particularly to the method and apparatus which are used for general reproduction of information, communication or reproducing an information signal on a recording medium such as an optical disk or a magneto-optical disk.

2. Description of the Related Art

A typical system for recording or reproducing information known by the inventors of the present application is arranged to take the steps of individually reproducing timing signals in synchronism with a front edge and a rear edge of an information mark recorded on a recording medium such as an optical disk, reproducing the data corresponding to the front edge and the tail edge of the information mark in parallel, and synthesizing the reproduced data for the purpose of reproducing an original serial data. This system is disclosed in Japanese Patent Application Laying Open (KOKAI) No. 61-214278. As another system known by the inventors, it is possible to refer to "a system for detecting separate edges" used as a reproducing method, which is described in "Speeding up and increasing the capacity of an optical disk based on a pit-edge recording and MCAV recording system", Nationwide Learning Society of Electronic Information Communication, Autumn, 1990, SC-3-2.

Now, the deacription will be directed to the recording or reproducing system with a mark length on an optical disk. At first, an original information signal is modified into serial data consisting of 0 and 1 ranged in sequence. The original information signal may be directly used without modification. The modification is executed for the purpose of easily reproducing a bit-synchronization signal from a reproduction signal or suppressing waveform distortion of the reproduced signal, thereby enhancing reliability of information recording or reproduction. To achieve the purposes, it is possible to arrange the continuous bits "0" not to be too long or the bits "1" not to come too close to each other. Then, the following signals are utilized for this system in synchronism to the serial data. A recording signal is produced according to a light output of a recording laser beam. It indicates that the two states of the light output, that is, high and low, are alternately transited in synchronous to the serial data. At the bit "1" of the serial data, the state of the light output is changed. A plurality of marks are formed on the optical disk for indicating holy data is recorded when the recording laser beam is applied on the recording tracks at a constant speed for scanning. These marks are formed at predetermined intervals on the optical disk. Next, a reproduced signal is produced by taking the steps of scanning the optical disk as keeping the light output of the recording laser beam low for the purpose of avoiding breakage of information patterns on the optical medium, receiving the reflected light (or transparent light) from the medium, and converting the quantity of the received light into an electric signal. The tailing edge and the leading edge of the reproduced pulse signal correspond to the front edge and the rear edge of each mark. As another signal, a binary signal is produced by converting the waveform of the reproduced signal into a binary signal and inverting the binary signal. A bit-synchronization signal can be reproduced at the front edge and the rear edge of each mark.

It is preferable to make the binary signal equal to the recording signal. In actual, however, the length of the mark is made variable according to the change of a recording laser power, a recording laser beam diameter, or a sensitivity of a recording medium. In particular, as to the optical disk, a practically important issue is a variation of the mark length. If the mark length is variable, the binary signal is slipped on time against the bit-synchronization signal reproduced at the front edge and the rear edge of the mark. As a disadvantage, it is likely that the reproduced data becomes erroneous. To overcome the disadvantage, the foregoing systems have been proposed. However, these systems have another disadvantage as follows. Each of these systems is arranged to separate the serial data into the data for tile front edge of each mark and the data for the rear edge of the mark for the purpose of reproducing the data and to synthesize two kinds of parallel data into one serial data before reproducing meaningful data. Hence, these systems have difficulty in checking for the reproduced data by taking the steps of reproducing meaningful data in real time and recognizing it or in reproducing data accurately by feeding back the reproduced data into a data reproducing system. In addition, these systems are very costly.

Moreover, these systems are devised to allow a particular signal, re-synchronous signal, to be individually recognized from the data for the front edge or the data for the rear edge of each mark. This results in breaking the compatibility of an optical disk used in this system with an optical disk used in the systems proposed before the known systems, because the sector format of these systems is different from that of the hereto-proposed systems. In addition, a special reproducing circuit is required to be added. The foregoing systems have no availability in the field of an optical disk, for example and are very costly.

SUMMARY OF THE INVENTION

It is therefore an object of the present invention to provide a method and an apparatus for recording or reproducing information on or from a recording medium which is capable of accurately reproducing information as keeping the compatibility of a recording medium used in another method and apparatus without having to be more costly.

In carrying out the object, a method for recording or reproducing information on or from a recording medium according to a first aspect of the invention, the method capable of reproducing serial data on the basis of signals derived on each of front edges or each of rear edges of a plurality of pieces of recorded information on the recording medium, includes the steps of:

reproducing bit-synchronization signals corresponding to each ones of the front edges and the rear edges from signals derived on the front edges and the rear edges alternately provided in the recorded information, the bit-synchronization signals having individual phases but the same frequency as each other;

switching the bit-synchronization signal for each of the front edges into the other bit-synchronization signal for each of the rear edges or the bit-synchronization signal for each of the rear edges into the other bit-synchronization signal for each of the front edges after a predetermined time each time the bit-synchronization signal is detected;

synthesizing the bit-synchronization signals so that a phase of the synthesized bit-synchronization signal constantly matches to phases of the front edges and the rear edges to be detected; and sequentially reproducing the serial data from signals derived on a lot of the front edges and the rear edges by using the synthesized bit-synchronization signal.

A method for recording or reproducing information on or from a recording medium according to a second aspect of the invention is that the predetermined time is (n+0.5) times a period of the bit-synchronization signal for each of the front edges or each of the rear edges, where the n is an integer equal to or more than 0.

An apparatus for recording or reproducing information on or from a recording medium according to a third aspect of the invention, the apparatus capable of reproducing serial data on the basis of signals derived on each of front edges or each of rear edges of a plurality of pieces of recorded information on the recording medium, includes:

a circuit for reproducing bit-synchronization signals corresponding to each ones of the front edges and the rear edges from signals derived on the front edges and the rear edges alternately provided in the recorded information, the bit-synchronization signals having individual phases but the same frequency as each other;

a circuit for synthesizing the bit-synchronization signals so that the bit-synchronization signal for each of the front edges is switched into the other bit-synchronization signal for each of the rear edges or the bit-synchronization signal for each of the rear edges is switched into the other bit-synchronization signal for each of the front edges after a predetermined time each time the bit-synchronization signal is detected and so that a phase of the synthesized bit-synchronization signal constantly matches to phases of the front edges and the rear edges to be detected;

a delay circuit for generating a delay signal served as a gate signal used when the synthesizing circuit switches the bit-synchronization signal into the other bit-synchronization signal; and a circuit for sequentially reproducing the serial data from signals derived on a lot of the front edges and the rear edges by using the synthesized bit-synchronization signal.

A method for recording or reproducing information on or from a recording medium according to a fourth-aspect of the invention, the method capable of reproducing serial data on the basis of signals derived on each of front edges or each of rear edges of a plurality of pieces of recorded information on the recording medium, includes the steps of:

reproducing a bit-synchronization signal based on a signal derived from at least one of the front edges and the rear edges;

detecting a phase difference between the bit-synchronization signal and the signal derived from at least one of the front edges and the rear edges;

correcting a time interval between each of the front edges and each of the rear edges of an original signal based on the detected phase difference;

correcting the original signal so that a phase of the bit-synchronization signal for each of the front edges matches to a phase of the bit-synchronization signal for each of the rear edges; and sequentially reproducing the serial data based on the corrected signal and the bit-synchronization signal common to each of the front edges and each of the rear edges.

An apparatus for recording or reproducing information on or from a recording medium according to a fifth aspect of the invention, the apparatus capable of reproducing serial data on the basis of signals derived on each of front edges or each of rear edges of a plurality of pieces of recorded information on the recording medium, includes:

a circuit for reproducing a bit-synchronization signal based on a signal derived from at least one of the front edges and the rear edges;

an edge selecting circuit for detecting a phase difference between the bit-synchronization signal and the signal derived from at least one of the front edges and the rear edges;

a phase comparing circuit for correcting a time interval between each of the front edges and each of the rear edges of an original signal based on the detected phase difference;

a pulse width correcting circuit for correcting the original signal so that a phase of the bit-synchronization signal for each of the front edges matches to a phase of the bit-synchronization signal for each of the rear edges; and a circuit for sequentially reproducing the serial data based on the corrected signal and the bit-synchronization signal common to each of the front edges and each of the rear edges.

A method for recording or reproducing information on or from a recording medium according to a sixth aspect of the invention, the method capable of reproducing serial data on the basis of signals derived on each of front edges or each of rear edges of a plurality of pieces of recorded information on the recording medium, includes the steps of:

reproducing a bit-synchronization signal based on a signal derived from both of the front edges and the rear edges;

detecting a phase difference between the bit-synchronization signal and the signal derived from the front edges and the rear edges;

correcting a time interval between each of the front edges and each of the rear edges of an original signal based on the detected phase difference;

correcting the original signal so that the bit-synchronization signal for each of the front edges matches to the bit-synchronization signal for each of the rear edges; and sequentially reproducing the serial data based on the corrected signal and the reproduced bit-synchronization signal.

In operation, in the method and the apparatus according to the first and the third aspects of the invention, the data is allowed to be accurately reproduced from even the signals slipped on timing from the front edge or the rear edge of the recorded information. Further, it is possible to reproduce the data consisting of a bit train in real time, that is, in the same sequence as the recorded serial data. Hence, the error or the signal slip for synchronization can be detected in real time so that an abnormal operation in the data reproducing system may be detected accurately.

In the method according to the second aspect of the invention, the interval of a delay signal served as a gate signal for switching a signal is made to be (n+0.5) times a period of the bit-synchronization signal so as to allow the signal to be switched in a broader range. This makes it possible to reproduce the data on more appropriate timing.

In the method and the apparatus according to the fourth to the sixth aspects of the invention, the method and the apparatus can realize the same effects obtained by the first to the third aspects of the invention, and may offer a broader range of application than those according to the first to the third aspects of the invention.

Further objects and advantages of the present invention will be apparent from the following description of the preferred embodiments of the invention as illustrated in the accompanying drawings.

BRIEF DESCRIPTION OF THE DRAWINGS

Fig, 1 is a timing chart showing signals produced in the field of the related art.

DESCRIPTION OF THE PREFERRED EMBODIMENTS

Figure 1:
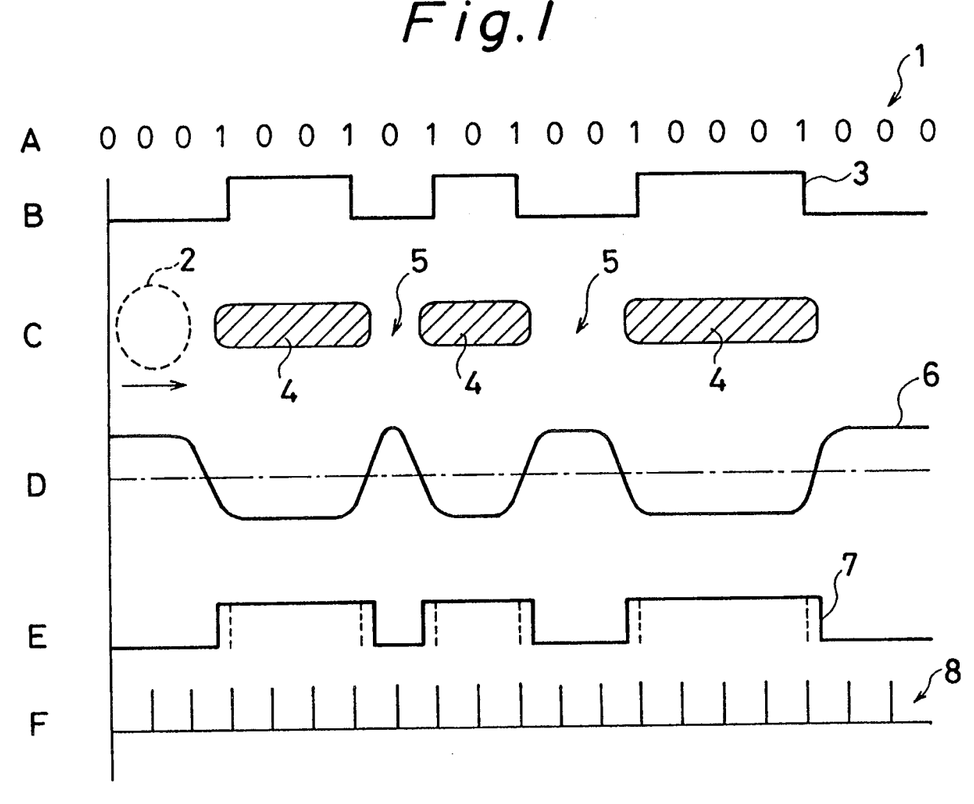
Figure 2:
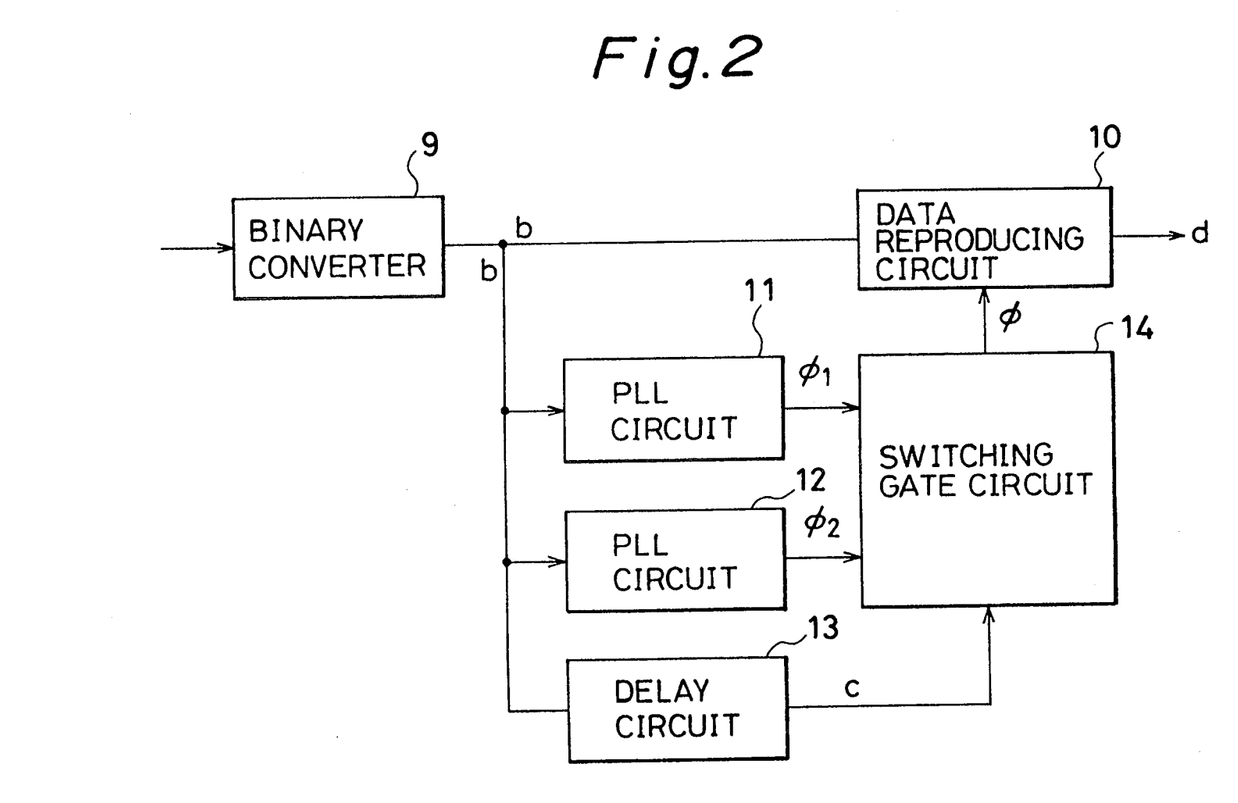
FIG. 2 is a block diagram showing an apparatus for recording or reproducing information according to an embodiment of the first to the third aspects of the invention.
Figure 3:
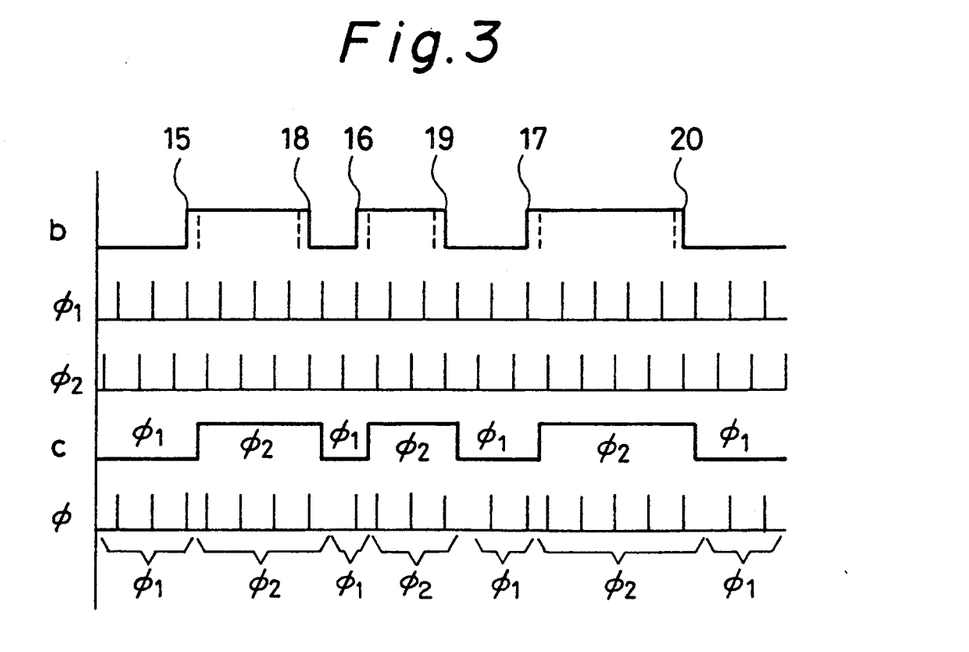
FIG. 3 is a timing chart showing signals formed in the components of the apparatus shown in FIG. 2.

Herein, the description will be directed to a method and an apparatus for recording or reproducing information according to an embodiment of the first to the third aspects of the invention as referring to FIGS. 1 to 3.

Before, describing the apparatus, the signals used in the apparatus will be described as shown in FIG. 1.

As shown in FIG. 1, a reference symbol A denotes serial data into which an original information signal is modified. The modification is carried out, because the modified signal is convenient in recording or reproducing information on or from a recording medium. The original information signal may be used without modification. The modified serial data is required so that the length of continuous bits "0" is not so long and the bits "1" do not come closer to each other. If the requirement is met, the reproduction of a bit-synchronization signal from the reproduced signal is made easier or the waveform distortion of the reproduced signal may be suppressed. This results in enhancing the reliability of the information recording or reproduction.

A reference symbol B denotes a waveform of a recording signal 3 composed of a recording laser beam 2. The change of a light output of the recording laser beam 2 in the recording signal 3 takes place according to the change of the serial data 1. That is the light output changes high or low each time a bit "1" appears in the serial data A, A reference symbol C indicates a recording state when the recording laser beam 2 composed of the light output shown by the reference number B is scanned on recording tracks at a constant speed and toward an arrow. A mark 4 is formed at predetermined intervals so that a mark spacing 5 may be formed between the adjacent marks 4.

A reference symbol D denotes a reproduced signal 6 produced by taking the steps of applying the recording laser beam 2 on the recording medium for scanning as keeping the light output of the recording laser beam 2 low for the purpose of avoiding breakage of information patterns, receiving the reflected light (or transparent light) from the recording medium, and converting the intensity of the received light into an electric signal. The front edge of each mark 4 corresponds to the tailing edge of the waveform of the reproduced signal 6 and the rear edge of each mark 4 corresponds to the leading edge of the waveform of the reproduced signal 6. Alternatively, the front edge and the rear edge of each mark 4 may be arranged to correspond to a positive and a negative pulses of the signal produced by differentiating the reproduced signal 6 by one order or to a leading edge and a tailing edge of the pulsed signal produced by differentiating the reproduced signal 6 by two orders. It means that the actually used reproduced signal is not limited to the shown reproduced signal 6. For the convenience's sake in explanation the shown waveform of the reproduced signal 6 is used.

A reference symbol E denotes a waveform of a binary signal 7 obtained by converting the waveform of the reproduced signal 6 into the binary waveform and inverting the resulting binary waveform. In this way, the reproduced binary signal 7 can be obtained on the basis of the recording signal 3.

A reference symbol F denotes a waveform of a bit-synchronization signal 8 reproduced from the front edge and the rear edge of the mark 4.

FIG. 2 shows an overall arrangement of the apparatus for recording or reproducing information according to an embodiment of the first to the third aspects of the invention.

As shown in FIG. 2, the apparatus includes a binary converter 9, a data reproducing circuit 10, PLL (Phase Locked Loop) circuits 11 and 12, a delay circuit 13, and a switching gate circuit 14.

The reproduced signal a (corresponding to the reproduced signal 6 shown in FIG. 1) is entered into the binary converter 9 in which the reproduced signal a is converted into a binary signal b. The binary signal b is applied into the data reproducing circuit 10, the PLL circuits 11, 12, and the delay circuit 13. The latter circuits 11 to 13 serves to reproduce a bit-synchronization signal. Concretely, the PLL circuit 11 serves to reproduce a bit-synchronization signal $\phi_1$ from the signal derived on the front edge of the mark 4 (see FIG. 1). The PLL circuit 12 serves to reproduce a bit-synchronization signal $\phi_2$ from the signal derived on the rear edge of the mark 4. The delay circuit 13 is provided for obtaining a delay signal c served as a gate signal. The output signals $\phi_1$, $\phi_2$ and c are applied to the switching gate circuit 14 served as a bit-synchronization signal synthesizing circuit, from which a bit-synchronization signal $\phi$ is synthesized and output. The data reproducing circuit 10 serves to reproduce the data based on the binary signal b and the bit-synchronization signal $\phi$. The resulting data is a reproduced signal d.

Then, the description will be directed to how the signal waveforms are related with one another in the components of the apparatus as referring to FIG. 3. FIG. 3 shows the signal waveform in each component of the apparatus shown in FIG. 2. In FIG. 3, the waveforms of the binary signal b, the bit-synchronization signal $\phi_1$, the bit-synchronization signal $\phi_2$, the delay signal c, and the bit-synchronization signal $\phi$ are shown in sequence, these signals correspond to the signals represented by the reference symbols E and F in FIG. 1.

The binary signal b is a signal produced by converting the reproduced signal 6 shown by the reference symbol D of FIG. 1 into a binary signal. The leading edges 15, 16 and 17 correspond to the front edge of each mark 4 and the tailing edges 18, 19 and 20 correspond to the rear edge of each mark 4. In the binary signal b, the portion indicated by a broken line means an ideal rising or falling timing. In actual, as shown in a real line, the leading edge and the tailing edge of the binary signal b are slipped to and fro. By the way, the slip of the rising or falling timing is systematically or regularly carried out. The timing relation between the adjacent leading edges is substantially constant, excepting the portion depending on the original signal. The timing relation between the adjacent tailing edges indicates the similar tendency. It means that the slip of the rising timing takes place relatively with the slip of the falling timing. The object of this embodiment is for reducing this slip of the timing.

The reference symbol $\phi_1$ denotes a bit-synchronization signal reproduced on the rising timing of the binary signal b corresponding to the front edge of the mark 4. The reference symbol $\phi_2$ denotes a bit-synchronization signal reproduced in the falling timing of the binary signal b corresponding to the rear edge of the mark 4. The signals $\phi_1$ and $\phi_2$ have the same frequency but different phases from each other. These two phases coincide with each other by accident. Even if this situation appears, nothing disadvantageous takes place in this embodiment. Hence, the description will be proceeded on the assumption that the phases of $\phi_1$ and $\phi_2$ are different from each other.

Basically, based on the bit-synchronization signal $\phi_1$, the data is reproduced from the signal derived on the front edge of the mark 4. Based on the bit-synchronization signal $\phi_2$, the data is reproduced from the signal derived on the rear edge of the mark 4. According to this embodiment, the meaningful data reproduction is allowed in the real-time sequence of the front edge and the rear edge of each mark 4 without reproducing the data independently of the front edge and the rear edge of each mark 4.

The reference symbol c denotes a signal produced by delaying the binary signal b only by half of the period of the signal $\phi_1$ or $\phi_2$. When the delay signal c is at low level, the bit-synchronization signal $\phi_1$ is selected. When the delay signal c is at high level, the bit-synchronization signal $\phi_2$ is selected. These selected signals are serially synthesized so as to compose a bit-synchronization signal $\phi$ for data reproduction. The data reproduction is executed by using the synthesized bit-synchronization signal $\phi$ and the binary signal b. This makes possible to obtain the reproduced signal d in which the serial data is reproduced from the recorded information data in real time.

The synthesized bit-synchronization signal $\phi$ is arranged so that when the data is reproduced from the front edge of the mark 4, the bit-synchronization signal is switched into the signal phase-synchronized with the timing of the front edge of the mark 4 and when the data is reproduced from the rear edge of the mark 4, the bit-synchronization signal is switched into the signal phase-synchronized with the timing of the rear edge of the mark 4. Hence, the data production is carried out from both of the front edge and the rear edge of the mark on the optimal timing. As mentioned above, the delay signal c used as a switching gate signal is produced by delaying the binary signal b by a half of a period of the bit-synchronization signal $\phi$. The delaying time may be (n+0.5) times where n is an integer equal to or more than 0 in the light of the original signal 1 (see the reference symbol A shown in FIG. 1). That is, in a case that the number of bits "0" allowed between the adjacent bits "1" is m or more, an integer equal to or less than (m-1) may be selected as n.

Therefore, by performing the operation shown in FIG. 3 in the arrangement shown in FIG. 2, the data is allowed to be reproduced if the timing of the front edge or the rear edge of the mark 4 is slipped in the signal. Further, it is possible to reproduce the data consisting of a bit train of "0" and "1" ranged in real time, that is, in the same sequence as the original serial data. Hence, the error detection or the synchronous slippage detection is allowed in real time, resulting in making it possible to rapidly detect if an abnormal matter takes place in the operation of the data reproducing circuit 10, thereby enhancing the reliability of the data reproduction. Further, the use of a general-purpose recording format makes contribution to enhancing the compatibility with the recording medium formatted in another apparatus or to lowering the cost of the data reproducing circuit 10. In addition, the application of the recording medium to an optical disk results in improving the reliability of the data reproduction and the recording density of the recording medium.

Figure 4:
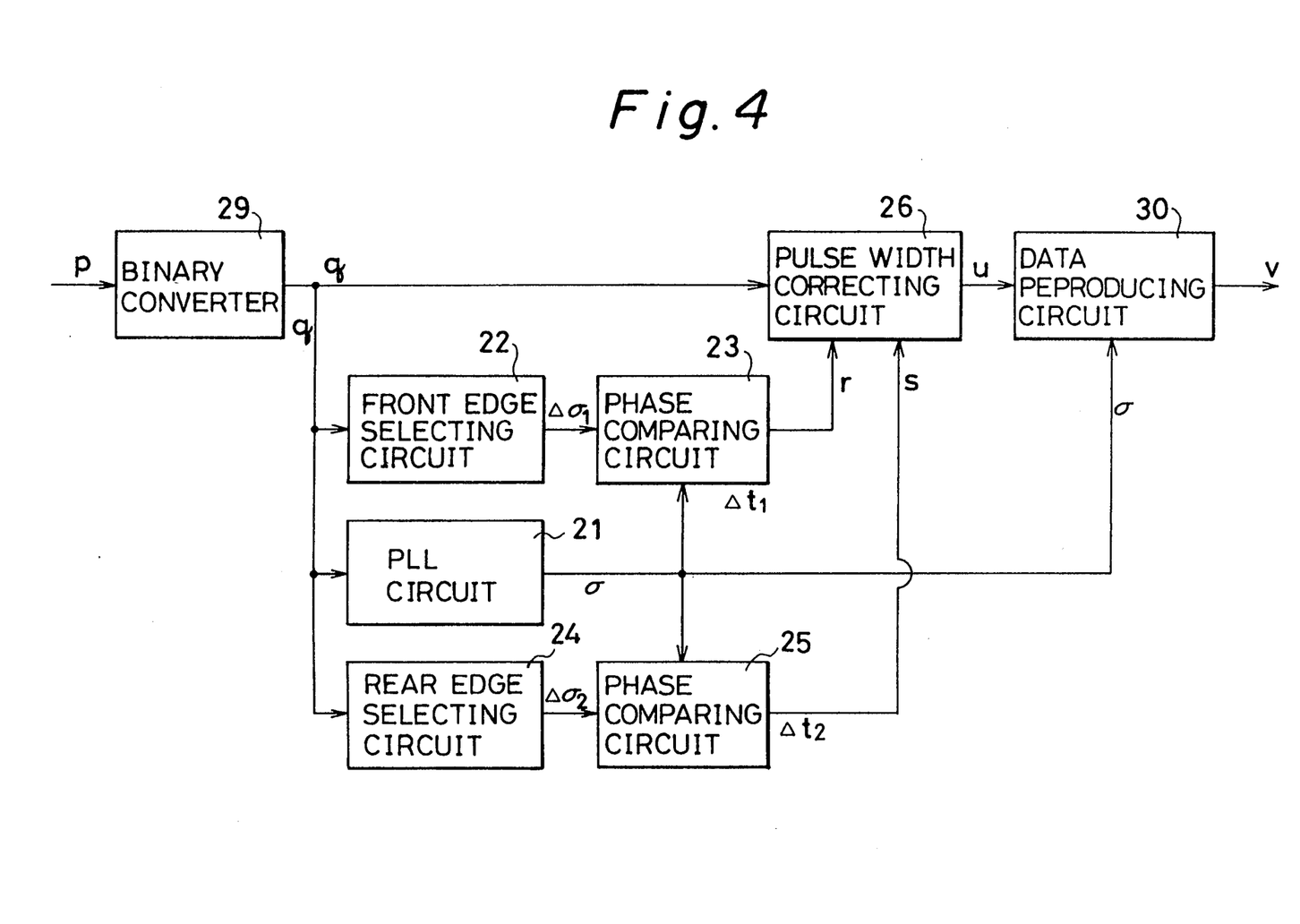
FIG. 4 is a block diagram showing an apparatus for recording or reproducing information according to an embodiment of the fourth to the sixth aspects of the invention.
Figure 5:
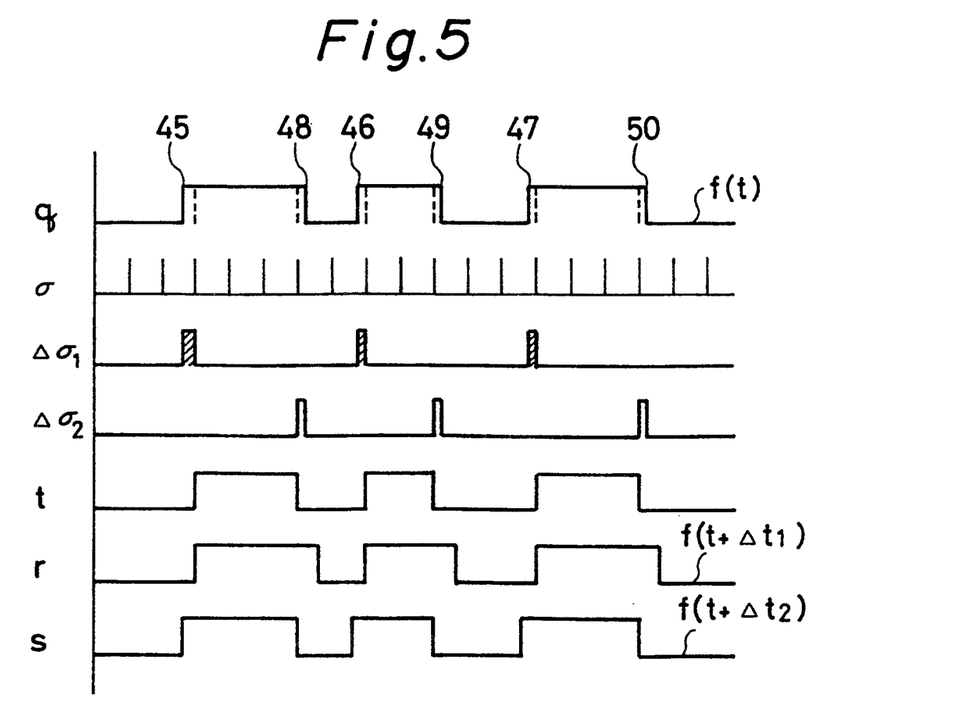
FIG. 5 is a timing chart showing signals formed in the components of the apparatus shown in FIG. 4.

Then, the description will be directed to a method and an apparatus for recording or reproducing information according to an embodiment of the fourth to the sixth aspects of the invention as referring to FIGS. 1, 4 and 5. The same portion of this embodiment as that of the foregoing embodiment is not descriptive. The same components or signals of this embodiment as those of the foregoing embodiment have the same reference symbols or numbers.

FIG. 4 shows the overall arrangement of an apparatus for recording or reproducing the information according to this embodiment of the invention.

As shown in FIG. 4, the apparatus includes a PLL circuit 21, a front edge selecting circuit 22, phase comparing circuits 23 and 25, a rear edge selecting circuit 24, a pulse width correcting circuit 26, a binary converter 29, and a data reproducing circuit 30.

The reproduced signal p is applied into the binary converter 29 in which the reproduced signal p is converted into the binary signal q. The binary signal 9 is applied to the PLL circuit 21 served as a circuit for reproducing a bit-synchronization signal. The PLL circuit 21 produces a bit-synchronization signal $\sigma$. The binary signal q is applied through the front edge selecting circuit 22 into the phase comparing circuit 23 in which the signal (phase slippage) $\Delta\sigma_1$ corresponding to the front edge of the mark 4 (see FIG. 1) is compared with the reproduced bit-synchronization signal $\sigma$. The front edge selecting circuit 22 is served as a circuit for selecting the front edge or the rear edge of the mark 4. The phase comparing circuit 23 serves to produce a signal r indicating an average phase difference $\Delta t_1$. Likewise, the binary signal q is applied through the rear edge selecting circuit 24 into the phase comparing circuit 25 in which a signal (phase slippage) $\Delta\sigma_2$ corresponding to the rear edge of the mark is compared with the reproduced bit-synchronization signal $\sigma$. The rear edge selecting circuit 24 is served as a circuit for selecting the front edge or the rear edge of the mark 4. The phase comparing circuit 25 serves to produce a signal s indicating an average phase difference $\Delta t_2$. Then, the signals r and s are applied into the pulse width correcting circuit 26 in which the original binary signal q is corrected in pulse width into a signal u based on the average phase differences derived from the signals r and s. The signal u is applied into a data reproducing circuit 30 in which the reproduced signal v is derived on the bit-synchronization signal $\sigma$.

Then, the description will be directed to how the signal waveforms are related with one another in the components of the apparatus as referring to FIG. 5. FIG. 5 shows the signal waveforms in the components of the apparatus.

As shown in FIG. 5, the leading edges 45, 46 and 47 correspond to the front edge of each mark 4 (see FIG. 1) and the tailing edges 48, 49 and 50 correspond to the rear edge of each mark 4. The bit-synchronization signal $\sigma$ is a signal reproduced by the PLL circuit 21 based on the signal derived on the leading edge for the front edge of the mark 4 and the signal derived on the tailing edge for the rear edge of the mark 4. The phase of the bit-synchronization signal $\sigma$ is not allowed to follow the signal corresponding to the alternate appearance of the front edge and the rear edge of the mark 4. Hence, the phase of the bit-synchronization signal $\sigma$ is arranged to match to an intermediate timing between the front edge and the rear edge of the mark 4 so that the phase may be slipped with respect to the front edge or the rear edge by the substantially same interval of time. The signals $\Delta\sigma_1$ and $\Delta\sigma_2$ indicate how much the phases are slipped. The reference symbol $\Delta\sigma_1$ denotes an output waveform formed by comparing the phase of the bit-synchronization signal $\phi$ with the front edge of the mark 4. The reference symbol $\Delta\sigma_2$ denotes an output waveform formed by comparing the phase of the bit-synchronization signal $\sigma$ with the rear edge of the mark 4. The oblique lines shown in the output waveform $\Delta\sigma_1$ indicate that the phase of the signal derived on the front edge is later than the bit-synchronization signal $\sigma$. Next, based on the signals $\Delta\sigma_1$ and $\Delta\sigma_2$ indicating the detected phase slippages, the binary signal q is changed so that the slippage of the front-edge or the rear-edge timing of the binary signal q from the bit-synchronization signal $\sigma$ may be made smaller. This results in being able to obtain a signal u whose phase slippage is made smaller against the bit-synchronization signal o and reproducing the original data highly reliably in light of these signals u and $\sigma$.

Next, the description will be directed to a method for obtaining the signal u. Assuming that the original signal q is f(t), the signals r and s are generated so that the signal f(t) may be slipped by $f(t+\Delta t_1)$ and $f(t+\Delta t_2)$. The logic AND of $f(t+\Delta t_1)$ and $f(t+\Delta t_2)$ results in producing the signal u. Herein, the reference symbol $\Delta t_1$ or the reference symbol $\Delta t_2$ denotes an average phase difference of the original signal q from the bit-synchronization signal $\sigma$. The use of the bit-synchronization signals $\sigma$ derived on the front edge and the rear edge of the mark 4 allows the binary signal q to be quickly and accurately applied into the PLL circuit 21. The present embodiment, therefore, may offer the same effect as the foregoing embodiment.

In place of an information reproducing method according to the present embodiment, it is possible to take the method for reproducing the bit-synchronization signal $\sigma$ from either one of the signals derived on the front edge and the rear edge of the mark. In this method, the bit-synchronization signal $\sigma$ is compared in phase with the signal derived on the other edge rather than the edge on which the signal $\sigma$ is detected for detecting an average phase slippage between both of the signals for the front edge and the rear edges. Based on the detected slippage, the signal for the front edge or the rear edge may be changed so that the phase slippage may be suppressed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for recording or reproducing information on or from a recording medium, the method capable of reproducing serial data on the basis of signals derived on each of front edges and each of rear edges of a plurality of pieces of recorded information on said recording medium, comprising the steps of:

reproducing first and second bit-synchronization signals respectively corresponding to said front edges and said rear edges from signals derived on said front edges and said rear edges alternately provided in said recorded information, said first and second bit-synchronization signals having individual phases but the same frequency as each other;

alternatively switching the first and second bit-synchronization signals after a predetermined time every time the first or second bit-synchronization signal is detected;

synthesizing the first and second bit-synchronization signals in such a manner that a phase of the synthesized bit-synchronization signal constantly corresponds to phases of said front edges and said rear edges to be detected; and sequentially reproducing the serial data directly from signals derived on a lot of said front edges and said rear edges by using the synthesized bit-synchronization signal.

2. A method according to claim 1, wherein said predetermined time is (n+0.5) times a period of the first or second bit-synchronization signal, said n being an integer equal to or more than 0.

3. An apparatus for recording or reproducing information on or from a recording medium, said apparatus capable of reproducing serial data on the basis of signals derived on each of front edges and each of rear edges of a plurality of pieces of recorded information on said recording medium, comprising:

a bit-synchronization signal reproducing circuit for reproducing first and second bit-synchronization signals respectively corresponding to said front edges and said rear edges from signals derived on said front edges and said rear edges alternately provided in said recorded information, said first and second bit-synchronization signals having individual phases but the same frequency as each other;

a bit-synchronization signal synthesizing circuit for alternatively switching the first and second bit-synchronization signals after a predetermined time every time the first or second bit-synchronization signal is detected, and for synthesizing the first and second bit-synchronization signals in such a manner that a phase of the synthesized bit-synchronization signal constantly corresponds to phases of said front edges and said rear edges to be detected;

a delay circuit for generating a delay signal as a gate signal on each switching by said synthesizing circuit; and a data reproducing circuit for sequentially reproducing the serial data directly from signals derived on a lot of said front edges and said rear edges by using the synthesized bit-synchronization signal.

* * * * *